(12) United States Patent
Stuntebeck et al.

(10) Patent No.: US 11,902,281 B2
(45) Date of Patent: *Feb. 13, 2024

(54) ON-DEMAND SECURITY POLICY ACTIVATION

(71) Applicant: AirWatch LLC, Atlanta, GA (US)

(72) Inventors: Erich Stuntebeck, Marietta, GA (US); Jonathan Blake Brannon, Mableton, GA (US)

(73) Assignee: AirWatch LLC, Atlanta, GA (US)

( * ) Notice: Subject to any disclaimer, the term of this patent is extended or adjusted under 35 U.S.C. 154(b) by 437 days.

This patent is subject to a terminal disclaimer.

(21) Appl. No.: 17/004,617

(22) Filed: Aug. 27, 2020

(65) Prior Publication Data

US 2020/0396226 A1    Dec. 17, 2020

Related U.S. Application Data

(63) Continuation of application No. 16/157,427, filed on Oct. 11, 2018, now Pat. No. 10,785,228, which is a continuation of application No. 15/714,032, filed on Sep. 25, 2017, now Pat. No. 10,116,662, which is a continuation of application No. 13/862,218, filed on Apr. 12, 2013, now Pat. No. 9,787,686.

(51) Int. Cl.
*H04L 9/40* (2022.01)
(52) U.S. Cl.
CPC ........ *H04L 63/102* (2013.01); *H04L 63/0272* (2013.01)
(58) Field of Classification Search
CPC .......................... H04L 63/102; H04L 63/0272
See application file for complete search history.

(56) References Cited

U.S. PATENT DOCUMENTS

| | | | |
|---|---|---|---|
| 4,679,226 A | 7/1987 | Muehleisen |
| 5,237,614 A | 8/1993 | Weiss |
| 5,446,888 A | 8/1995 | Pyne |
| 5,574,786 A | 11/1996 | Dayan |
| 5,625,869 A | 4/1997 | Nagamatsu |
| 5,631,947 A | 5/1997 | Wittstein |
| 5,799,068 A | 8/1998 | Kikinis |
| 5,826,265 A | 10/1998 | Van Huben |

(Continued)

FOREIGN PATENT DOCUMENTS

| | | |
|---|---|---|
| CA | 2149337 | 6/1994 |
| GB | 2309860 | 5/2000 |

(Continued)

OTHER PUBLICATIONS

"Blackberry Wireless Handheld 5810 Getting Started Guide", Research in Motion, Jan. 15, 2003.

(Continued)

*Primary Examiner* — Abiy Getachew
(74) *Attorney, Agent, or Firm* — King Intellectual Asset Management

(57) ABSTRACT

On-demand activation of a security policy may be provided. Upon receiving a selection of a link, a profile identified by a security policy associated with the link may be activated and the link may be opened according to the security policy. In some embodiments, opening the link according to the security policy may comprise redirecting the opening of the link from a first application to a second application.

20 Claims, 3 Drawing Sheets

(56) References Cited

U.S. PATENT DOCUMENTS

| | | |
|---|---|---|
| 5,864,683 A | 1/1999 | Boebert |
| 5,870,459 A | 2/1999 | Phillips |
| 5,961,590 A | 10/1999 | Mendez |
| 5,966,081 A | 10/1999 | Chesnutt |
| 5,974,238 A | 10/1999 | Chase |
| 5,987,609 A | 11/1999 | Hasebe |
| 6,006,332 A | 12/1999 | Rabne |
| 6,021,492 A | 2/2000 | May |
| 6,023,708 A | 2/2000 | Mendez |
| 6,085,192 A | 7/2000 | Mendez |
| 6,131,096 A | 10/2000 | Ng |
| 6,131,116 A | 10/2000 | Riggins |
| 6,151,606 A | 11/2000 | Mendez |
| 6,167,253 A | 12/2000 | Farris |
| 6,233,341 B1 | 5/2001 | Riggins |
| 6,269,369 B1 | 7/2001 | Robertson |
| 6,463,470 B1 | 10/2002 | Mohaban |
| 6,480,096 B1 | 11/2002 | Gutman |
| 6,560,772 B1 | 5/2003 | Slinger |
| 6,606,662 B2 | 8/2003 | Nagasaki |
| 6,636,489 B1 | 10/2003 | Fingerhut |
| 6,668,322 B1 | 12/2003 | Wood |
| 6,708,221 B1 | 3/2004 | Mendez |
| 6,714,859 B2 | 3/2004 | Jones |
| 6,726,106 B1 | 4/2004 | Han |
| 6,727,856 B1 | 4/2004 | Hill |
| 6,741,232 B1 | 5/2004 | Siedlikowski |
| 6,741,927 B2 | 5/2004 | Jones |
| 6,766,454 B1 | 7/2004 | Riggins |
| 6,779,118 B1 | 8/2004 | Ikudome |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin |
| 7,032,181 B1 | 4/2006 | Farcasiu |
| 7,039,394 B2 | 5/2006 | Bhaskaran |
| 7,039,679 B2 | 5/2006 | Mendez |
| 7,064,688 B2 | 6/2006 | Collins |
| 7,092,943 B2 | 8/2006 | Roese |
| 7,184,801 B2 | 2/2007 | Farcasiu |
| 7,191,058 B2 | 3/2007 | Laird |
| 7,203,959 B2 | 4/2007 | Nachenberg |
| 7,225,231 B2 | 5/2007 | Mendez |
| 7,228,383 B2 | 6/2007 | Friedman |
| 7,275,073 B2 | 9/2007 | Ganji |
| 7,284,045 B1 | 10/2007 | Marl |
| 7,287,271 B1 | 10/2007 | Riggins |
| 7,308,703 B2 | 12/2007 | Wright |
| 7,310,535 B1 | 12/2007 | Mackenzie |
| 7,353,533 B2 | 4/2008 | Wright |
| 7,363,349 B2 | 4/2008 | Friedman |
| 7,363,361 B2 | 4/2008 | Tewari |
| 7,373,517 B1 | 5/2008 | Riggins |
| 7,400,428 B2 | 7/2008 | Yoshida |
| 7,437,752 B2 | 10/2008 | Heard |
| 7,444,375 B2 | 10/2008 | McConnell |
| 7,447,506 B1 | 11/2008 | MacKenzie |
| 7,447,799 B2 | 11/2008 | Kushner |
| 7,475,152 B2 | 1/2009 | Chan |
| 7,480,907 B1 | 1/2009 | Marolia |
| 7,496,847 B2 | 2/2009 | Koehane |
| 7,496,957 B2 | 2/2009 | Howard |
| 7,539,665 B2 | 5/2009 | Mendez |
| 7,565,314 B2 | 7/2009 | Borgeson |
| 7,590,403 B1 | 9/2009 | House |
| 7,594,224 B2 | 9/2009 | Patrick |
| 7,603,547 B2 | 10/2009 | Patrick |
| 7,603,548 B2 | 10/2009 | Patrick |
| 7,603,703 B2 | 10/2009 | Craft |
| 7,617,222 B2 | 11/2009 | Coulthard |
| 7,620,001 B2 | 11/2009 | Ganji |
| 7,620,392 B1 | 11/2009 | Maurya |
| 7,650,491 B2 | 1/2010 | Craft |
| 7,660,902 B2 | 2/2010 | Graham |
| 7,665,118 B2 | 2/2010 | Mann |
| 7,665,125 B2 | 2/2010 | Heard |
| 7,685,645 B2 | 3/2010 | Doyle |
| 7,686,545 B2 | 3/2010 | Hedrick |
| 7,698,269 B2 | 4/2010 | Zhou |
| 7,702,322 B1 | 4/2010 | Maurya |
| 7,702,785 B2 | 4/2010 | Bruton |
| 7,735,112 B2 | 6/2010 | Kim |
| 7,735,122 B1 | 6/2010 | Johnson |
| 7,739,334 B1 | 6/2010 | Ng |
| 7,752,166 B2 | 7/2010 | Quinian |
| 7,788,382 B1 | 8/2010 | Jones |
| 7,792,297 B1 | 9/2010 | Piccionelli |
| 7,840,631 B2 | 11/2010 | Farcasiu |
| 7,873,959 B2 | 1/2011 | Zhu |
| 7,890,091 B2 | 2/2011 | Puskoor |
| 7,912,896 B2 | 3/2011 | Wolovitz |
| 7,917,641 B2 | 3/2011 | Crampton |
| 7,970,386 B2 | 6/2011 | Bhat |
| 8,001,082 B1 | 8/2011 | Muratov |
| 8,012,219 B2 | 9/2011 | Mendez |
| 8,041,776 B2 | 10/2011 | Friedman |
| 8,046,823 B1 | 10/2011 | Begen |
| 8,060,074 B2 | 11/2011 | Danford |
| 8,069,144 B2 | 11/2011 | Quinian |
| 8,078,157 B2 | 12/2011 | Maurya |
| 8,086,957 B2 | 12/2011 | Bauchot |
| 8,094,591 B1 | 1/2012 | Hunter |
| 8,099,332 B2 | 1/2012 | Lemay |
| 8,117,344 B2 | 2/2012 | Mendez |
| 8,150,431 B2 | 4/2012 | Wolovitz |
| 8,166,106 B2 | 4/2012 | Biggs |
| 8,225,381 B2 | 7/2012 | Lemke |
| 8,359,016 B2 | 1/2013 | Lindeman |
| 8,433,620 B2 | 4/2013 | Futty |
| 8,504,831 B2 | 8/2013 | Pratt |
| 8,713,646 B2 | 4/2014 | Stuntebeck |
| 8,776,168 B1 * | 7/2014 | Gibson .......... H04L 63/102 709/225 |
| 8,826,432 B2 | 9/2014 | Dabbiere |
| 8,832,785 B2 | 9/2014 | Stuntebeck |
| 8,972,590 B2 | 3/2015 | Haghpassand |
| 8,978,110 B2 | 3/2015 | Dabbiere |
| 11,068,584 B2 * | 7/2021 | Burriesci .......... G06F 21/51 |
| 2002/0013721 A1 | 1/2002 | Dabbiere |
| 2002/0049644 A1 | 4/2002 | Kargman |
| 2002/0055967 A1 | 5/2002 | Coussement |
| 2002/0098840 A1 | 7/2002 | Hanson |
| 2002/0194292 A1 | 12/2002 | King |
| 2003/0033283 A1 | 2/2003 | Evans |
| 2003/0033541 A1 | 2/2003 | Edmark |
| 2003/0061515 A1 | 3/2003 | Kindberg |
| 2003/0065934 A1 | 4/2003 | Angelo |
| 2003/0110084 A1 | 6/2003 | Eberhard |
| 2003/0110397 A1 | 6/2003 | Supramaniam |
| 2003/0172166 A1 | 9/2003 | Judge |
| 2003/0186689 A1 | 10/2003 | Herle |
| 2003/0187798 A1 | 10/2003 | Mckinley |
| 2003/0204716 A1 | 10/2003 | Rockwood |
| 2003/0233410 A1 | 12/2003 | Gusier |
| 2004/0006615 A1 | 1/2004 | Jackson |
| 2004/0006706 A1 | 1/2004 | Erlingsson |
| 2004/0054779 A1 | 3/2004 | Takeshima |
| 2004/0098715 A1 | 5/2004 | Aghera |
| 2004/0123153 A1 | 6/2004 | Wright |
| 2004/0133520 A1 | 7/2004 | Callas |
| 2004/0181687 A1 | 9/2004 | Nachenberg |
| 2004/0224703 A1 | 11/2004 | Takaki |
| 2004/0260821 A1 | 12/2004 | Yamamoto |
| 2005/0003804 A1 | 1/2005 | Huomo |
| 2005/0060643 A1 | 3/2005 | Glass |
| 2005/0071748 A1 | 3/2005 | Shipp |
| 2005/0228990 A1 | 10/2005 | Kato |
| 2005/0246192 A1 | 11/2005 | Jauffred |
| 2005/0257261 A1 | 11/2005 | Shraim |
| 2005/0260996 A1 * | 11/2005 | Groenendaal ......... H04W 48/04 455/445 |
| 2005/0273629 A1 | 12/2005 | Abrams |
| 2006/0031407 A1 | 2/2006 | Dispensa |
| 2006/0190984 A1 | 8/2006 | Heard |

(56) References Cited

U.S. PATENT DOCUMENTS

| | | |
|---|---|---|
| 2006/0224742 A1 | 10/2006 | Shahbazi |
| 2006/0224842 A1 | 10/2006 | Suto |
| 2006/0288220 A1 | 12/2006 | Pennington |
| 2007/0016613 A1 | 1/2007 | Foresti |
| 2007/0033397 A1 | 2/2007 | Phillips |
| 2007/0093243 A1 | 4/2007 | Kapadekar |
| 2007/0136207 A1 | 6/2007 | Davydov |
| 2007/0136235 A1 | 6/2007 | Hess |
| 2007/0136492 A1 | 6/2007 | Blum |
| 2007/0143603 A1 | 6/2007 | Hadden |
| 2007/0156897 A1 | 7/2007 | Lim |
| 2007/0174433 A1 | 7/2007 | Mendez |
| 2007/0192588 A1 | 8/2007 | Roskind |
| 2007/0260883 A1 | 11/2007 | Giobbi |
| 2007/0261009 A1 | 11/2007 | Granicher |
| 2007/0261099 A1 | 11/2007 | Broussard |
| 2007/0271608 A1 | 11/2007 | Shimizu |
| 2007/0283430 A1 | 12/2007 | Lai |
| 2007/0288637 A1 | 12/2007 | Layton |
| 2007/0294416 A1 | 12/2007 | Agre |
| 2008/0010348 A1 | 1/2008 | Dawson |
| 2008/0051076 A1 | 2/2008 | O'Shaughnessy |
| 2008/0133712 A1 | 6/2008 | Friedman |
| 2008/0134305 A1 | 6/2008 | Hinton |
| 2008/0134347 A1 | 6/2008 | Goyal |
| 2008/0187140 A1 | 8/2008 | Mcgillian |
| 2008/0201453 A1 | 8/2008 | Assenmacher |
| 2008/0267144 A1 | 10/2008 | Jano |
| 2009/0030884 A1 | 1/2009 | Pulfer |
| 2009/0036111 A1 | 2/2009 | Danford |
| 2009/0144632 A1 | 6/2009 | Mendez |
| 2009/0198997 A1 | 8/2009 | Yeap |
| 2009/0217370 A1 | 8/2009 | Hulten |
| 2009/0253410 A1 | 10/2009 | Fitzgerald |
| 2009/0254967 A1* | 10/2009 | J. ................. H04L 63/20 726/1 |
| 2009/0260064 A1 | 10/2009 | Mcdowell |
| 2009/0292984 A1 | 11/2009 | Bauchot |
| 2009/0300739 A1 | 12/2009 | Nice |
| 2009/0307362 A1 | 12/2009 | Mendez |
| 2010/0005125 A1 | 1/2010 | Mendez |
| 2010/0005157 A1 | 1/2010 | Mendez |
| 2010/0005159 A1 | 1/2010 | Ishiguro |
| 2010/0005195 A1 | 1/2010 | Mendez |
| 2010/0023630 A1 | 1/2010 | Mendez |
| 2010/0050243 A1 | 2/2010 | Hardt |
| 2010/0061356 A1 | 3/2010 | Qvarfordt |
| 2010/0100641 A1 | 4/2010 | Quinian |
| 2010/0120450 A1 | 5/2010 | Herz |
| 2010/0125897 A1* | 5/2010 | Jain ............ H04L 63/0272 713/193 |
| 2010/0144323 A1 | 6/2010 | Collins |
| 2010/0146269 A1 | 6/2010 | Baskaran |
| 2010/0235918 A1 | 9/2010 | Mizrahi |
| 2010/0254410 A1 | 10/2010 | Collins |
| 2010/0268844 A1 | 10/2010 | Quinian |
| 2010/0273456 A1 | 10/2010 | Wolovitz |
| 2010/0299152 A1 | 11/2010 | Batchu |
| 2010/0299362 A1 | 11/2010 | Osmond |
| 2010/0299376 A1 | 11/2010 | Batchu |
| 2010/0299719 A1 | 11/2010 | Burks |
| 2010/0318623 A1 | 12/2010 | Bloch |
| 2011/0004941 A1 | 1/2011 | Mendez |
| 2011/0047169 A1 | 2/2011 | Leighton |
| 2011/0082900 A1 | 4/2011 | Nagpal |
| 2011/0113062 A1 | 5/2011 | Quinian |
| 2011/0131408 A1 | 6/2011 | Cook |
| 2011/0145932 A1 | 6/2011 | Nerger |
| 2011/0153779 A1 | 6/2011 | Mendez |
| 2011/0153799 A1 | 6/2011 | Ito |
| 2011/0167474 A1 | 7/2011 | Sinha |
| 2011/0167492 A1 | 7/2011 | Ghosh |
| 2011/0202589 A1 | 8/2011 | Piernot |
| 2011/0202987 A1* | 8/2011 | Bauer-Hermann ............ H04L 63/0815 726/7 |
| 2011/0225252 A1 | 9/2011 | Bhat |
| 2011/0270799 A1 | 11/2011 | Muratov |
| 2011/0276805 A1 | 11/2011 | Nagpal |
| 2011/0296186 A1 | 12/2011 | Wong |
| 2011/0320552 A1 | 12/2011 | Friedman |
| 2012/0005578 A1 | 1/2012 | Hawkins |
| 2012/0015644 A1 | 1/2012 | Danford |
| 2012/0102392 A1 | 4/2012 | Reesman |
| 2012/0198547 A1 | 8/2012 | Fredette |
| 2012/0204032 A1 | 8/2012 | Wilkins |
| 2012/0221955 A1 | 8/2012 | Raleigh |
| 2013/0061307 A1 | 3/2013 | Livne |
| 2013/0086466 A1 | 4/2013 | Levy |
| 2013/0097421 A1 | 4/2013 | Lim |
| 2013/0152169 A1 | 6/2013 | Stuntebeck |
| 2013/0219256 A1 | 8/2013 | Lloyd |
| 2013/0227397 A1 | 8/2013 | Tvorun |
| 2014/0020072 A1 | 1/2014 | Thomas |
| 2014/0022050 A1 | 1/2014 | Dua |
| 2014/0053059 A1 | 2/2014 | Weber |
| 2014/0157354 A1* | 6/2014 | Marshall ............ G06F 21/6218 726/1 |

FOREIGN PATENT DOCUMENTS

| | | |
|---|---|---|
| GB | 2346716 | 8/2000 |
| JP | 07141245 | 6/1995 |
| JP | 08251660 | 9/1996 |
| WO | WO9704389 | 2/1997 |
| WO | WO9922322 | 5/1999 |
| WO | WO0241661 | 5/2002 |

OTHER PUBLICATIONS

"Blackberry Wireless Handheld 5810 Quick Reference Guide", Research in Motion, 2003.

"Blackberry Wireless Handheld 5810 User Guide", Research in Motion, 2003.

"Creating Norton mcAnywhere Scripts", Symantec Corporation, 1994.

"Infinite Interchange", Infinite Technologies, 1997.

"JuiceDefender", Latredoid, Jan. 15, 2012.

"Laplink for Windows 95", Traveling Software, Inc., 1996.

"Mobilink Synchronization User's Guide", Sybase, Nov. 2001, Part No. 38132-01-0800-01.

"Nokia 9000i Owner's Manual", Nokia, 1997.

"PDA Defense User Guide", Asynchrony Software, Inc., 2002, 726.

"RemoteWare Client for Windows NT and Windows 95 User's Guide", Xcellent, Inc, 1996.

"RemoteWare Forms and RemoteWare Query", Xcellent, Inc., 1994.

"RemoteWare Forms Getting Started Guide", Xcellent, Inc., 1994.

"RemoteWare Server for Windows NT", Xcellent, Inc., 1996.

"RemoteWare Server for Windows NT: Administrator's Guide", Xcellent, Inc., 1996.

"RemoteWare Server Operations Guide", Xcellent, Inc., 1992.

Belani, Eshwar , et al., "The CRISIS Wide Area Security Architecture", 1998, 726.

Benaloh, Josh , et al., "Patient Controlled Encryption: Ensuring Privacy of Electronic Medical Records", Nov. 13, 2009, 726.

Fox, Armando , et al., "Security on the Move: Indirect Authentication using Kerberos", Nov. 13, 2009, 726.

Gong, Li , et al., ""Multicast Security and its Extension to a Mobile Environment"", (copy provided in U.S. Appl. No. 14/337,338), Oct. 1995.

Khang D, DO, "NFOA in U.S. Appl. No. 13/316,073", Jan. 18, 2013.

Kiskinen, Jani , et al., "Data Channel Service for Wireless telephone Links", Jan. 1996.

Menaria, Pankaj , et al., "Security in Mobile Database Systems", Mar. 17, 2011, 707, 726.

(56) References Cited

OTHER PUBLICATIONS

Pfitzmann, Andreas, et al., "Mobile User Devices and Security Modules: Design for Trustworthiness", Feb. 5, 1996, 726.
Ratner, David, et al., "Replication Requirements in Mobile Environments", Nov. 2001.
Ratner, David H, "Roam: A scalable Replication System for Mobile and Distributed Computing", Jan. 1998.
Stajano, Frank, et al., "The Thinnest of Clients: Controlling It All Via Cellphone", Mobile Computing and 18 Communications Review, Oct. 1998, vol. 2, No. 4.
Steiner, Jennifer, "Kerberos: An Authentication Service for Open Network Systems", Jan. 12, 1988, 726.
Strunk, John, et al., "Self-Securing Storage: Protecting Data in Compromised Systems", Symposium on Operating Systems Design and Implementation, 2000, 726.
Wachowicz, Moniza, et al., "Combining Location and Data Management in an Environment for Total Mobility", In proceeding of International Workshop on Information Visualization and Mobile Computing, 1996.

* cited by examiner

ON-DEMAND SECURITY POLICY ACTIVATION

This application claims priority as a continuation of U.S. patent application Ser. No. 16/157,427, filed Oct. 11, 2018, which is a continuation of U.S. patent application Ser. No. 15/714,032, filed Sep. 25, 2017 and issued Oct. 30, 2018 as U.S. Pat. No. 10,116,662, which is a continuation of U.S. patent application Ser. No. 13/862,218, filed Apr. 12, 2013 and issued Oct. 10, 2017 as U.S. Pat. No. 9,787,686, all of which are expressly incorporated by reference herein.

BACKGROUND

On-demand activation of security policies provides for launching web links and applications in a secure manner. In some situations, certain resources, such as e-mail and corporate intranet web pages, may only be available when a device is signed into a VPN. The VPN connection process can be cumbersome and time consuming, however. Conventional approaches approach this problem by keeping a device signed into a VPN for extended periods, but this can prove taxing on battery and network resources.

SUMMARY

This Summary is provided to introduce a selection of concepts in a simplified form that are further described below in the Detailed Description. This Summary is not intended to identify key features or essential features of the claimed subject matter nor is this Summary intended to be used to limit the claimed subject matter's scope.

On-demand activation of a security policy may be provided. Upon receiving a selection of a link, a profile identified by a security policy associated with the link may be activated and the link may be opened according to the security policy. In some embodiments, opening the link according to the security policy may comprise redirecting the opening of the link from a first application to a second application.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
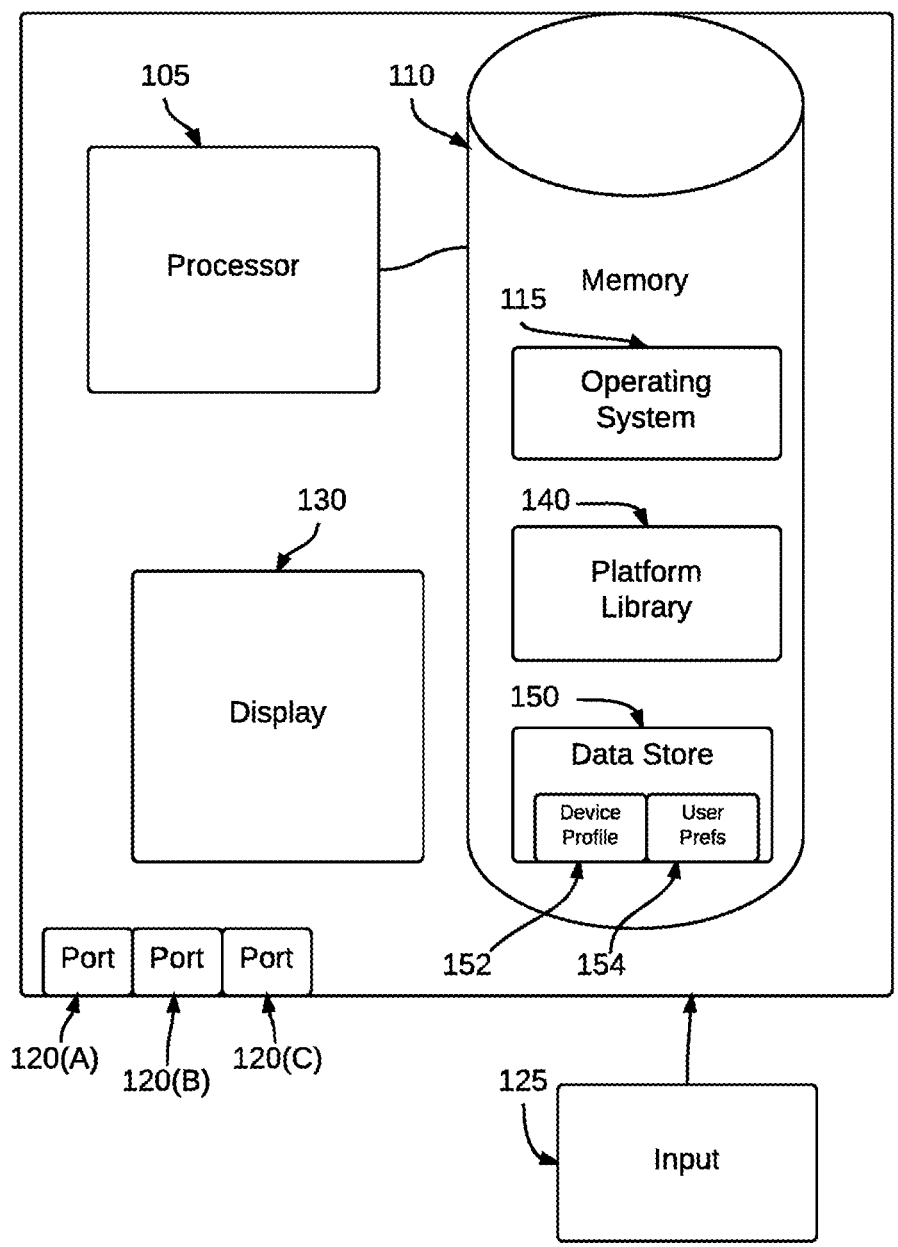
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

On-demand virtual private networking (VPN) may be provided. On most computing devices, such as personal computers, laptops, tablets, smartphones, etc., selectable links are often displayed. These links may be associated with default applications. For example, a uniform resource locator (URL) link to a web page may be associated with a default web browser, while a symbolic file system link to an image file may be associated with a photo editing application.

In some cases, however, these links may refer to secure resources, such as those accessible only after a user has authenticated with a destination server of the link or only while a user's device is connected to a virtual private network. For example, the symbolic link to the image file may point to a file on a shared network drive associated with a security policy that requires entry of an appropriate username and password.

The security policy may comprise, for example, a Virtual Private Network (VPN) policy. Such a policy may require that the user's computing device be connected to a VPN in order to access secured resources, but allow connection to non-secured resources whether the VPN is connected or not. The security policy may require, for example, that all URL links to resources and/or content located within a corporate intranet, may only be accessed via an encrypted connection and/or via an application operative to execute in a secure environment (e.g., a secure memory sandbox). The security policy may therefore activate a VPN connection whenever a link to resources stored on the intranet is selected and/or whenever any links in a policy-specified application are opened, such as requiring any links opened from an e-mail application to require the VPN be in place before opening. This may allow for enterprise policies and actions to be taken while opening the link, such as screening for viruses, spam, or malware, encrypting the data associated with the link, and/or redirecting the computing device to open the link using a different application than a normal default application.

The computing device may be configured to launch the VPN on demand to a "placeholder" IPSEc VPN a policy and/or management server. The device may auto dial this VPN for any intranet URL and/or any link listed in an email. Upon launching the VPN, a proxy may be configured using a Proxy-Auto-Config (PAC) file. A PAC file defines how applications can automatically choose the appropriate proxy server and/or access method for opening a given link, often using JavaScript functions. The policy server may act as the PAC file to dynamically change the link of the requested resource to redirect from one application to another (e.g., from a default web browser to a secure/encrypted web browser). The app to which the link is redirected may use tunneling—individual session security to connect the app to the secure network through a secure tunnel without opening a full VPN connection—to connect to the backend network. The VPN may then auto disconnect to allow the redirect to launch in the new application. In some embodiments, the computing device may receive a list of secure sites that may be associated with the security profile. For example, active directory allows for the publication of an index of corporate intranet servers/sites that may be used to populate the list of secure sites.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or another device with like capability.

User device 100 may store in a data store 150 a device profile 152 and a plurality of user preferences 154. Device profile 152 may comprise an indication of the current position of user device 100 and/or indications of the hardware, software, and security attributes which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. User preferences 154 may comprise a listing of factors that may affect the experience of the user. In particular, user preferences 154 may include indications of the user's age, gender, bodily traits, preferred resource types, preferred venue resources, and combinations thereof.

Figure 2:
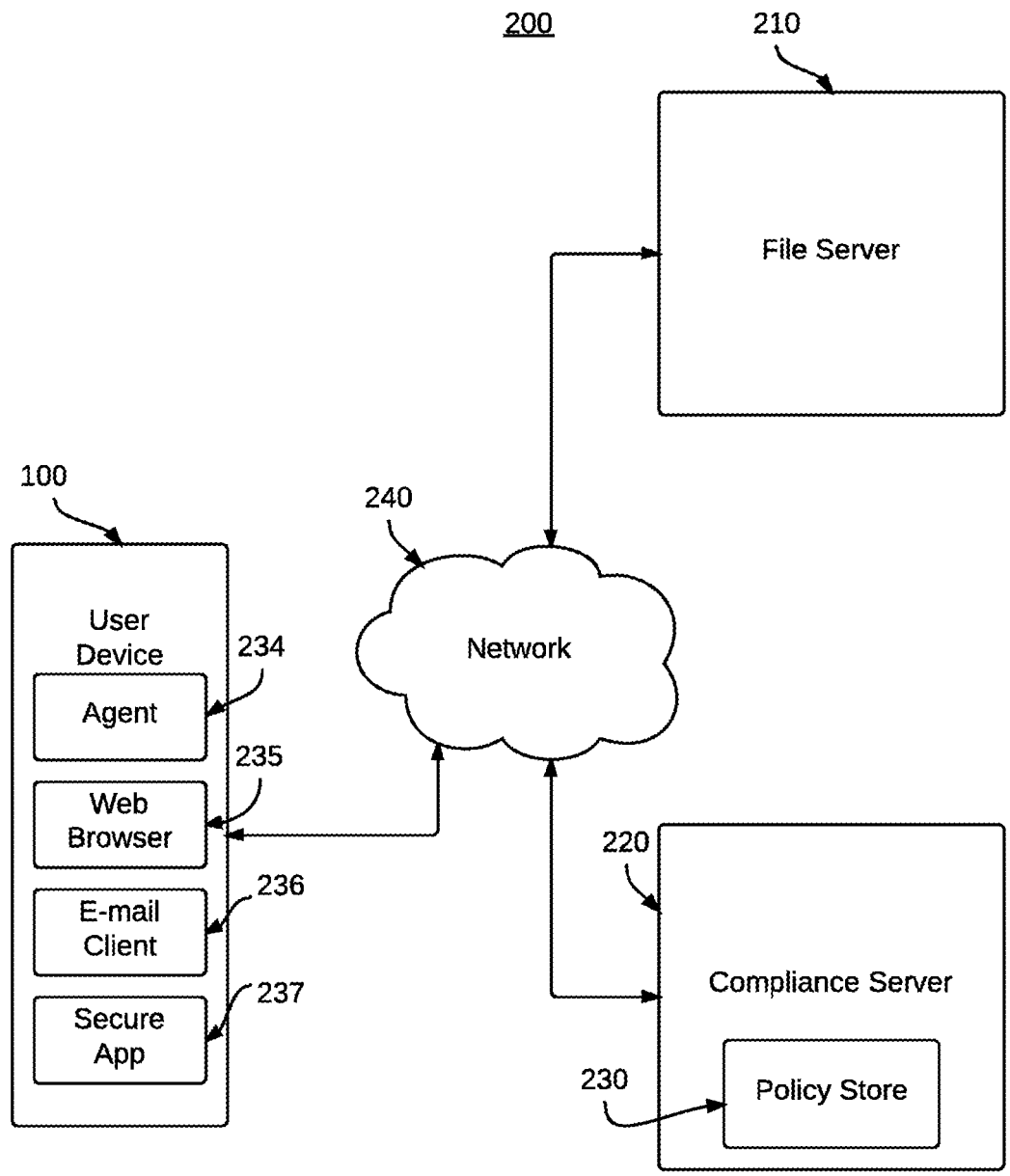
FIG. 2 is a block diagram of an operating environment.

FIG. 2 is a block diagram view of an operating environment 200 comprising user device 100 in communication with a file server 210 and a compliance server 220 via a network 240. The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as descried herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise a policy store 230 comprising a plurality of compliance rules and/or policies that may be applicable to user device 100. While the policy store 230 is shown as within the compliance server 220, the policy store 230 may alternately be within the user device 100 and/or remotely located on the file server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

In some embodiments, an agent application 234 executed on user device 100 may make the compliance determination based on the device profile, credentials, and/or user preferences. For instance, the agent application 234 may monitor calls by applications, such as a web browser 235, an e-mail client 236, and/or a secure application 237, on user device 110 to the operating system 115 of user device 100 to determine whether user device 110 seeks to perform functionality associated with a given compliance rule. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 110 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
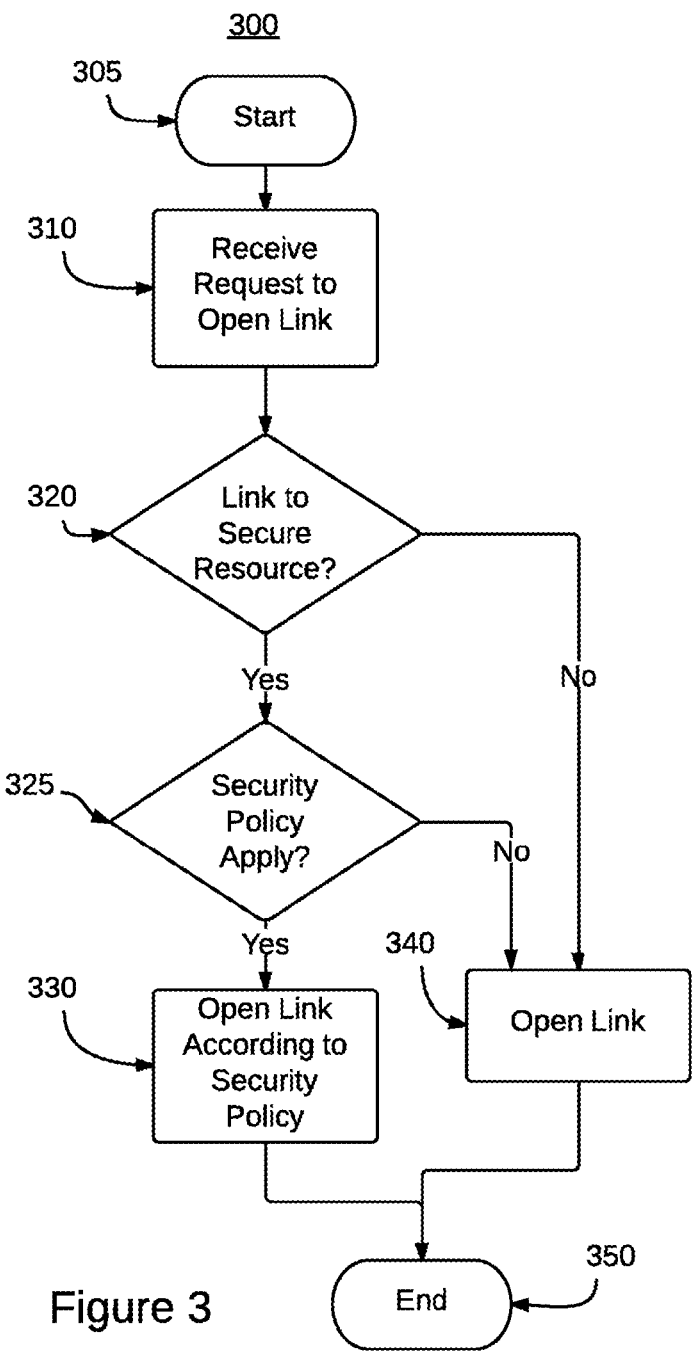
FIG. 3 is a flow chart illustrating a method for providing on-demand security policy activation.

FIG. 3 is a flow chart setting forth the general stages involved in a method 300 consistent with embodiments of this disclosure for providing on-demand VPN connectivity. Method 300 may be implemented using elements of operating environment 200 as described above. Ways to implement the stages of method 300 will be described in greater detail below. Method 300 may begin at starting block 305 and proceed to stage 310 where user device 100 may receive a request to open a link. For example, e-mail client 236 may receive a selection of a uniform resource locator (URL) displayed in an e-mail message.

From stage 310, method 300 may advance to stage 320 where user device 100 may determine whether the link is associated with a secure resource. For example, a plurality of secure source locations comprising remote servers that require authentication in order to access associated resources may be stored in a list in data store 150. For another example, any links to network resources associated with a particular server (e.g., file server 210), and/or network segment, such as a corporate intranet, may be determined to comprise secure resources.

From stage 320, method 300 may advance to stage 325 where user device 100 may determine whether a security policy applies to the link. For example, all secure resources, as identified at stage 320, above, may require one and/or more compliance policies to be in effect before the link may be opened. Such compliance policies may be provided to user device 100 by compliance server 220 and/or user device 100 may provide a description of the requested link to compliance server 220 for determination. In some embodiments, non-secure resources may still be associated with a required and/or optional security policy. The compliance policy may comprise, for example, a requirement that certain links be opened over a virtual private network (VPN) or other encrypted connection and/or may require that certain links be opened by a different application than may be used by default for links of the same type. For example, a secure web browser may be required to open links to corporate intranet resources, where the secure web browser is operative to execute in a sandboxed memory segment that may be securely erased at regular intervals and/or when the secure browser is closed.

From stage 325, method 300 may advance to stage 330 where user device 100 may open the link in accordance with the security policy. For example, user device 100 may activate a VPN connection prior to opening the link. For another example, user device 100 may redirect the opening of the link from a default application to a different application. Such a redirect may be achieved according to instructions provided by the security policy and/or the redirect may be provided by compliance server 220.

If the resource is not determined to comprise a secure resource or is not determined to be access controlled by a security policy, method 300 may advance to stage 340 where user device 100 may open the link using a default application. Method 300 may then end at stage 350.

An embodiment consistent with the disclosure may comprise a system for providing on-demand security policy activation. The system may comprise a memory storage and a processing unit coupled to the memory storage. The processing unit may be operative to receive a selection of a link, determine whether the link is associated with a security policy, and in response to determining that the link is associated with the security policy, activate a profile identified by the security policy and open the link according to the security policy, wherein opening the link according to the security policy comprises redirecting the opening of the link to the secure file from a first application to a second application. The processing unit may be further operative to determine whether a VPN is connected. If so, the processing unit may be operative to allow the link to be opened in one of a plurality of applications (e.g., allow the user to select an application.) If not, the processing unit may activate the VPN profile prior to opening the link.

Another embodiment consistent with the disclosure may comprise a system for providing on-demand security policy activation. The system may comprise a memory storage and a processing unit coupled to the memory storage. The processing unit may be operative to display a link, receive a request to open the link, determine whether the link comprises a link to a secure file, and, in response to determining that the link comprises the link to the secure file, determine whether a security policy applies to opening the link to the secure file, and open the link to the secure file in accordance with the security policy, wherein being operative to open the link to the secure file in accordance with the security policy comprises being operative to redirect the opening of the link to the secure file from a first application to a second application.

Yet another embodiment consistent with the disclosure may comprise a system for providing on-demand security policy activation. The system may comprise a memory storage and a processing unit coupled to the memory storage. The processing unit may be operative to receive a selection of a link to a resource, determine whether the resource comprises a secure resource, and, in response to determining that the resource comprises a secure resource, activate a security policy and open the link in accordance with the security policy, wherein opening the link in accordance with the security policy comprises redirecting the opening of the link from a first application to a second application.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM), Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at a user device, an identification of a resource locator;
   determining, at the user device, that the selected resource locator is associated with a secure resource;
   determining, at the user device, that a security policy applies to the secure resource, wherein the security policy requires a compliance policy to be in effect;
   determining, at the user device, that the compliance policy is in effect; and
   accessing the secure resource through the user device.

2. The method of claim 1, wherein the compliance policy requires a specific application on the user device to be used to access the secure resource.

3. The method of claim 2, wherein the specific application is different from an application used to select the resource locator.

4. The method of claim 1, wherein the compliance policy requires the user device to be connected to a Virtual Private Network ("VPN") to access the secure resource.

5. The method of claim 1, wherein determining that the security policy requires a compliance policy to be in effect comprises activating a profile identified by the security policy, wherein the profile requires the compliance policy to be in effect.

6. The method of claim 1, wherein determining that the compliance policy is in effect comprises the user device querying a management server that stores compliance information relating to the user device.

7. The method of claim 1, wherein determining that the selected resource locator is associated with the secure resource comprises determining that the secure resource is stored at a secure storage location.

8. A non-transitory, computer-readable medium comprising instructions that, when executed by a processor of a user device, performs stages comprising:
- receiving, at a user device, an identification of a resource locator;
- determining, at the user device, that the selected resource locator is associated with a secure resource;
- determining, at the user device, that a security policy applies to the secure resource, wherein the security policy requires a compliance policy to be in effect;
- determining, at the user device, that the compliance policy is in effect; and
- accessing the secure resource through the user device.

9. The non-transitory, computer-readable medium of claim 8, wherein the compliance policy requires a specific application on the user device to be used to access the secure resource.

10. The non-transitory, computer-readable medium of claim 9, wherein the specific application is different from an application used to select the resource locator.

11. The non-transitory, computer-readable medium of claim 8, wherein the compliance policy requires the user device to be connected to a Virtual Private Network ("VPN") to access the secure resource.

12. The non-transitory, computer-readable medium of claim 8, wherein determining that the security policy requires a compliance policy to be in effect comprises activating a profile identified by the security policy, wherein the profile requires the compliance policy to be in effect.

13. The non-transitory, computer-readable medium of claim 8, wherein determining that the compliance policy is in effect comprises the user device querying a management server that stores compliance information relating to the user device.

14. The non-transitory, computer-readable medium of claim 8, wherein determining that the selected resource locator is associated with the secure resource comprises determining that the secure resource is stored at a secure storage location.

15. A system comprising:
- a memory storage storing program code; and
- a processor coupled to the memory storage, wherein, upon execution, the program code causes the processor to perform stages including:
  - receiving, at a user device, an identification of a resource locator;
  - determining, at the user device, that the selected resource locator is associated with a secure resource;
  - determining, at the user device, that a security policy applies to the secure resource, wherein the security policy requires a compliance policy to be in effect;
  - determining, at the user device, that the compliance policy is in effect; and
  - accessing the secure resource through the user device.

16. The system of claim 15, wherein the compliance policy requires a specific application on the user device to be used to access the secure resource.

17. The system of claim 16, wherein the specific application is different from an application used to select the resource locator.

18. The system of claim 15, wherein the compliance policy requires the user device to be connected to a Virtual Private Network ("VPN") to access the secure resource.

19. The system of claim 15, wherein determining that the security policy requires a compliance policy to be in effect comprises activating a profile identified by the security policy, wherein the profile requires the compliance policy to be in effect.

20. The system of claim 15, wherein determining that the compliance policy is in effect comprises the user device querying a management server that stores compliance information relating to the user device.

\* \* \* \* \*